Oct. 3, 1967     F. E. KITE     3,344,476
MOLD PRESS
Filed May 4, 1965
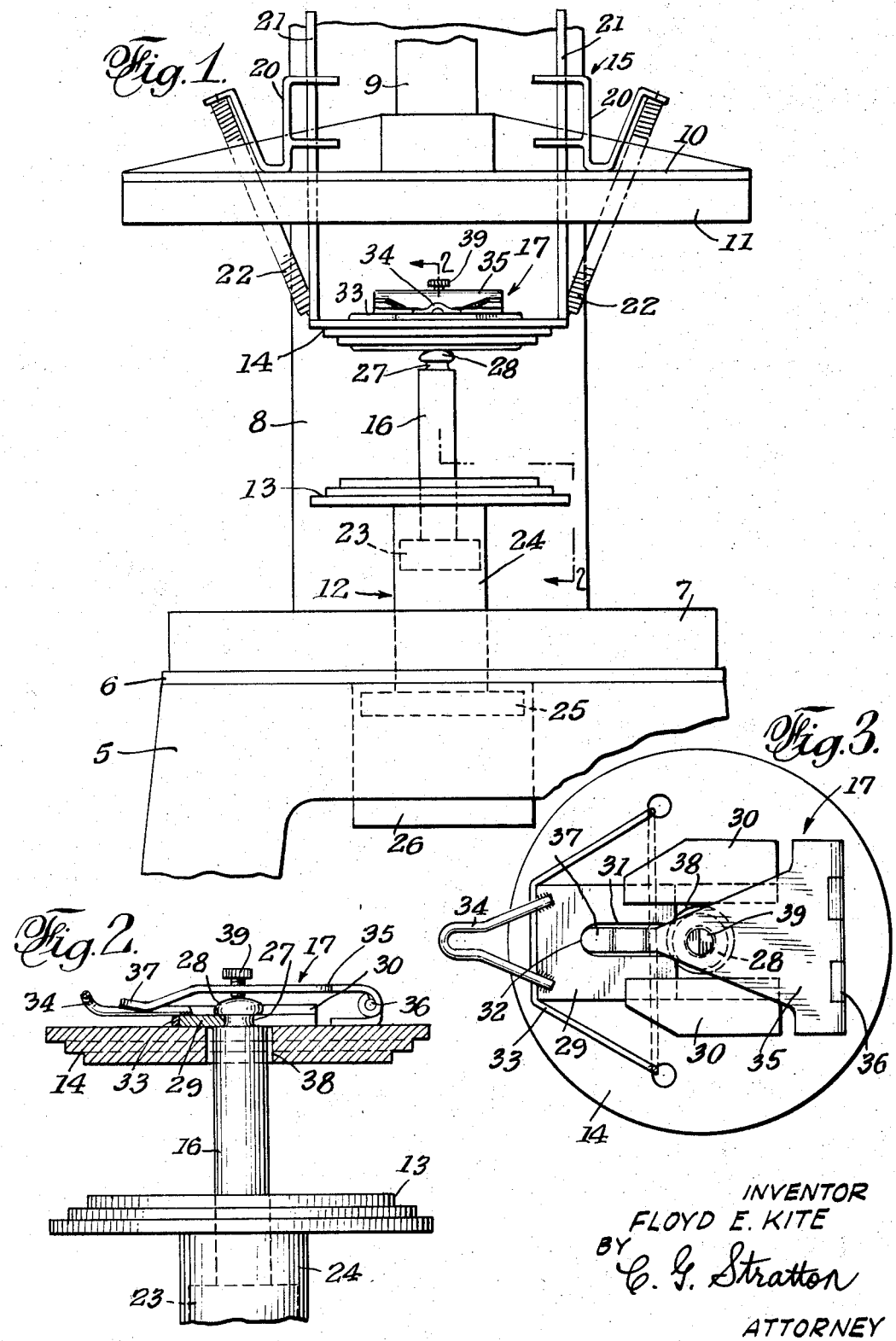
INVENTOR
FLOYD E. KITE
BY
C. G. Stratton
ATTORNEY United States Patent Office 3,344,476
Patented Oct. 3, 1967

3,344,476
MOLD PRESS
Floyd E. Kite, Van Nuys, Calif., assignor to McWhirter & Sons, Inc., Van Nuys, Calif., a corporation of California
Filed May 4, 1965, Ser. No. 453,049
3 Claims. (Cl. 18—18)

ABSTRACT OF THE DISCLOSURE

This invention relates to the suspension and control of a top bead plate in tire-retreading or mold presses, the suspension means being associated with guides connected to the outer portion of the top bead plate for insuring its aligned movement, brackets being utilized and insuring the aligned travel of the guides and including projecting portions for mounting of supporting springs connected to the outer upper portion of the top bead plate. The invention further comprehends a novel latch means for connecting the power shaft with the spring suspended top bead plate, whereby the power shaft is automatically locked as the shaft extends through the top bead plate, the latch including an adjusting screw associated with a hinged lock.

---

Conventional tire-retreading or mold presses are provided with upper and lower bead plates for engaging the beads of a tire, according to the bead diameter, to press the beads toward each other to reduce the bulk of the tire during vulcanizing. The lower bead plate is ordinarily disposed adjacent the lower platen of such a press and is movable vertically by power means during a tire-compressing operation. The upper bead plate, however, is ordinarily stored in a rack at the front of the press, marsupial fashion, until required in the operation. Then, it is transported manually from the rack to the press and, again manually, from the press to the rack after curing of the tire. Thus, this heavy metal part is handled twice during a vulcanizing procedure, a chore that is tiring on the operator.

An object of the present invention is to eliminate manual transport of the upper bead plate of a retreading press to and from operative position in the press by providing novel means to mount said plate on the top platen of the press.

Another object of the invention is to provide novel means for automatically coupling the upper bead plate with the lower power shaft of the press and utilizing said shaft to provide the power to raise and lower the upper bead plate relative to the lower bead plate during a tire-curing operation.

A further object of the invention is to provide said coupling means with a trip latch that, when actuated, effects separation of the upper bead plate from the power shaft.

This invention also has for its objects to provide such means that are positive in operation, convenient in use, easily installed in a working position and easily disconnected therefrom, economical of manufacture, relatively simple, and of general superiority and serviceability.

The above objects are realized in a press in which the upper bead plate is suspended from the top platen in such position that, upon lowering of said platen, said bead plate descends to a position above and in registry with a bottom bead plate. At a pre-determined point in the downward travel, said bead plate is engaged by and automatically locked to the extending shaft or end of a power hoist that is moved vertically from the bottom platen of the press. Then, as the power hoist is lowered to cause engagement of upper and lower tire molds around a tire that is to be cured, the top bead plate aligner is pulled into contact with the bead of the tire that is being supported by the lower bead aligning plate. The tire is thus compressed by movement of the beads thereof toward each other and is shrunk to its minimum diametral and cross-sectional size when the top mold half makes contact with the bottom mold half.

The means that latches or locks the upper bead plate to the extension of the power hoist is automatically triggered by said extension. After compression of the tire, the power hoist moves the locked-together bead plates upward as the upper mold separates from the lower mold. A manual release provided on said latch means disconnects the same from the mentioned extension, allowing removal of the tire and readying the press for the next curing operation.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a broken front elevational view of a retreading press provided with the improvements of the present invention, the same being shown with the bead plates of said press separated from each other.

FIG. 2 is an enlarged vertical sectional view showing said bead plates coupled together by the present latch means improvements.

FIG. 3 is a top plan view of the latch means.

FIG. 1 shows a retreading or mold press that conventionally comprises a base 5 that has a bottom platen 6 on which is supported a bottom mold 7, a rearwardly disposed column 8 that extends from the base 5 and mounts a power press cylinder that is represented by the ram 9 thereof and which carries a top platen 10 which exerts its pressure on a top mold 11.

Such a press, also conventionally, is provided with a power hoist 12 that mounts a bottom bead plate 13 that is raised and lowered, as required in the course of an operation, and is provided with a storage rack (not shown) for storing the top bead plate 14 when the same is removed from operative position, shoved and aligned with the bottom bead plate 13.

According to the invention, the above generally-described mold or retreading press is provided, generally, with means 15 to resiliently mount said top bead plate 14, a power and coupling shaft 16 extending axially through the bottom bead plate from said hoist 12, and a latch 17 carried by the top bead plate for separable coupling engagement with the shaft 16.

The mounting means 15 is shown as brackets 20 carried by the top platen 10 and constituting guides for rods 21 that extend from marginal portions of the plate 14, the brackets 20 guiding the plate for vertical movement on the axis of the press, i.e., of the ram 9 and hoist shaft 16. Means, such a springs 22 suspend the top bead plate 14 from said brackets 20, or other suitable connections, to the top platen 10, it being clear that said plate 14 may be raised and lowered by such movement of the platen 10 and, additionally, may be moved relative to the platen 10 against the bias of the springs 22. It is evident, from the above, that the plate 14 in both operative engagement with a tire and out-of-the-way, non-operative position is mounted, as above described, on the axis of the press.

The power shaft 16 comprises the stem of hydraulic, compressed air or other power means shown in the drawing as the hoist 12. A piston 23 on the lower end of said shaft 16, operates in a cylinder 24, and the latter constitutes a stem having a piston 25 that operates in a fixed cylinder 26 mounted in the base 5. The bottom bead plate 13 is carried by the cylinder 24 and has a central opening through which the shaft 16 extends. The upper end of said shaft 16 is provided with a groove 27 that is located below a rounded head 28. Said groove is shown as annular.

The latch 17 is shown as a slide 29 that is guided in ways 30 and is formed with an elongated notch 31 that terminates in a rounded end 32. The notch has a sliding fit around the neck of the shaft 16 that is formed by the groove 27. An elastic band 33 or the like biases the slide in a direction that engages the notch end 32 in said shaft groove 28, thereby connecting the slide to said shaft, as shown in FIG. 2. Said connection may be broken by withdrawing the slide to the position of FIG. 3, a handle 34, when pulled effecting such withdrawal.

A gravity- or spring-biased tongue 35, on a pivot 36, has an end 37 that falls into the slide notch 31 when the slide is retracted to latch the slide in the latter position, as in FIG. 3. Upon such retraction of the slide, the shaft 16 is released from the slide and, therefore, from the top bead plate 14. Upon the next movement of the plates 13 and 14 toward each other the head 28 of shaft 16 will extend through a hole 38 in the plate 14, engage an adjusting screw 39 on the tongue 35, and lift said tongue to withdraw the end 37 thereof from latching engagement with the notch end 32 of said tongue. The elastic 33 will automatically project the slide 29 to shaft-connecting position, as in FIG. 2.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. In a mold press having a vertically movable top platen and a top bead plate arranged below said top platen for engaging the rim bead on one side of a tire being compressed in said press, an axially aligned power hoist with an upwardly directed vertically movable power shaft, a bottom bead plate mounted on said hoist in axial register with said top bead plate, the mentioned shaft extending through the center of the top bead plate, (a) means including guide rods extending from the marginal portion of the top bead plate and extending upwardly therefrom through said top platen,
(b) brackets fixed to said top platen providing guides for the vertical movement of said guide rods, said brackets having lateral extensions,
(c) springs suspending the top bead plate from the lateral extensions of said brackets to resiliently support said top bead plate,
(d) a connecting portion at the upper portion of said power shaft,
(e) a spring-urged latch means carried by the top bead plate for automatically connecting said connecting portion of said power shaft to the top bead plate, and
(f) a hinged tongue member mounted on said top bead plate for retaining said latch in retracted position, said tongue member including a portion overlying said shaft for engagement therewith to release said spring latch means upon initial movement of said shaft, whereby said latch means will automatically form a locking connection with said shaft.

2. The structure of claim 1 characterized in that each of said brackets fixed to the top platen includes spaced portions for engaging each of the guide rods at spaced points to maintain the guide rods in alignment.

3. The structure of claim 1 characterized in that the spring latch is mounted upon the upper surface of the top bead plate and is provided with a recess for receiving the hinged tongue member therein, and an adjustable screw extends through the hinged tongue member for engagement with the shaft extremity for releasing the spring-urged latch means upon initial movement of said shaft.

References Cited

UNITED STATES PATENTS

| | | | |
|---|---|---|---|
| 2,826,783 | 3/1958 | Robbins | 18—18 |
| 2,835,921 | 5/1958 | White | 18—18 |
| 2,942,295 | 6/1960 | Duerksen et al. | 18—18 |
| 3,015,845 | 1/1961 | Duerksen | 18—18 |
| 3,067,457 | 12/1962 | Dennis et al. | 18—18 X |
| 3,130,446 | 4/1964 | Duerksen | 18—18 X |
| 3,137,032 | 6/1964 | MacMillan | 18—18 X |
| 3,162,898 | 12/1964 | Fike | 18—18 X |
| 3,184,794 | 5/1965 | Sherkin | 18—2 X |
| 3,200,443 | 8/1965 | Maddox et al. | 18—2 X |
| 3,233,284 | 2/1966 | MacMillan | 18—18 X |

J. SPENCER OVERHOLSER, *Primary Examiner.*

J. HOWARD FLINT, JR., *Examiner.*